March 21, 1950     A. R. NOBBS     2,501,535
DRAG MAGNET FOR WATTHOUR METERS
Filed March 25, 1948
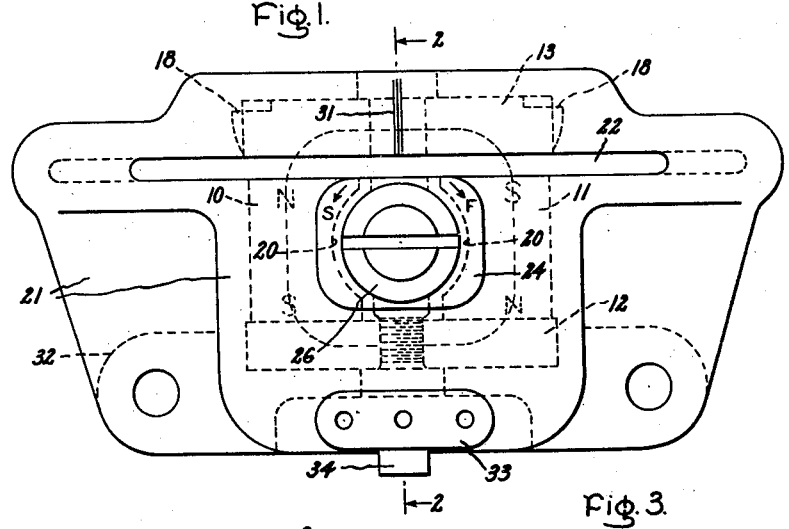
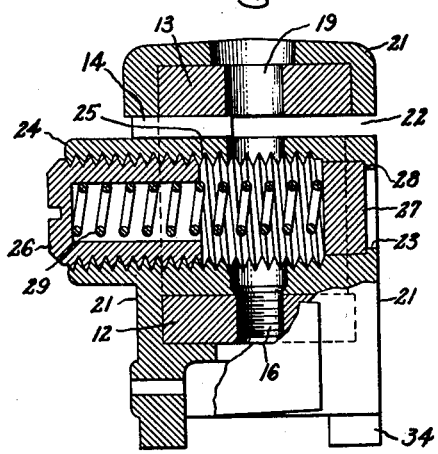
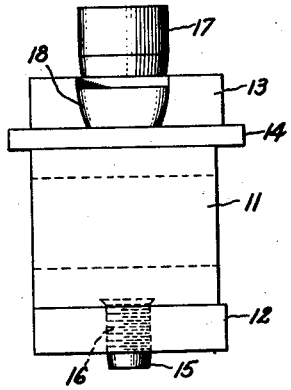
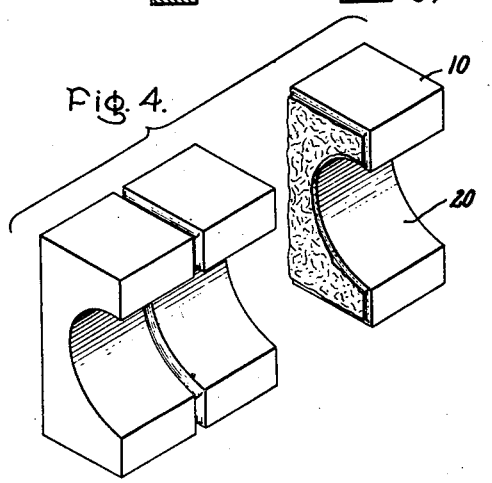
Inventor:
Albert R. Nobbs,
by *Brarell P. Mack*
His Attorney.

Patented Mar. 21, 1950

2,501,535

UNITED STATES PATENT OFFICE 2,501,535

DRAG MAGNET FOR WATT-HOUR METERS

Albert R. Nobbs, Sillery, Quebec, Canada, assignor to General Electric Company, a corporation of New York Application March 25, 1948, Serial No. 17,063
In Canada May 27, 1947

5 Claims. (Cl. 171—264)

My invention relates to a damping magnet system for rotating disc apparatus.

In watthour meters and the like in which the driven element is a thin disc of conducting material, it is customary to locate a permanent magnet adjacent the disc whereby the field of the currents produced in the disc by reason of its movement in the magnet field reacts with the magnet field to create a drag on the disc. It is also customary to provide for calibration of the meter by means associated with the permanent magnet whereby the effective magnet flux acting on the disc may be adjusted and hence the drag or braking effect adjusted. It is also common in induction disc meters to compensate for the tendency of the disc to run faster with rising temperatures by providing a shunt of material having a negative temperature coefficient of the permeability for the magnet flux whereby an increased proportion of the flux and hence increased damping is applied to the disc with rising temperature. As the damping magnet is applied to the disc, in the vicinity of the power circuits which drive the disc, it is important to shield the magnet from the demagnetizing effect thereon of the power circuit, particularly when heavy overload conditions occur or when heavy surges occur on the line.

It is the object of my invention to provide a damping magnet system of compact size and light weight which will meet the requirements indicated above and which will be of low cost of manufacture.

Is is a further object of my invention to provide a damping magnet system of the type specified which will have a wide range of calibration adjustment whereby it may be adapted to different meters with different requirements.

A further object of my invention is to provide a low cost damping magnet system whereby full advantage can be taken of the high coercive force magnetic materials now available.

Other and further objects and advantages of my invention will become apparent as the description proceeds, and my invention will be understood from the following detailed description taken in connection with the accompanying drawings of a preferred embodiment thereof. In the drawings, Fig. 1 is an elevation of a complete damping magnet system considered as looking from the left-hand side of Fig. 2; Fig. 2 is a vertical section on the line indicated by 2—2 of Fig. 1; Fig. 3 is an elevation of a magnet and its armature during a stage of its manufacture; and Fig. 4 represents a perspective view of a cast bar from which the permanent magnets are broken.

Referring to the drawings, reference characters 10 and 11 represent relatively short blocks of permanent magnet material of high coercive force, preferably of the type of permanent magnet alloy described in Canadian Patent 345,132, Mishima, dated October 9, 1934. The blocks 10 and 11 of magnet material are mounted spaced apart on a yoke 12 of highly permeable material. An armature 13 of highly permeable material is spaced above the upper end of the blocks 10 and 11 to complete a magnetic circuit. The unit is magnetized as indicated in Fig. 1 to provide a U-shaped magnet assembly and the magnetic flux traverses the two gaps between the armature 13 and each of the legs 10 and 11 as indicated by a closed dotted line. During manufacture, the yoke 12, blocks 10 and 11, and armature 13 are clamped firmly together by a bolt 15 having a head indicated at 17 whose body passes through a hole 19 provided in the armature 13, between the magnets 10 and 11 and screwthreadedly engages a tapped hole 16 in the yoke 12. The required spacing between the armature 13 and the adjacent face of the pair of blocks 10 and 11 is provided for by a spacer 14 as shown in Fig. 3.

The assembly as shown in Fig. 3 is placed in a suitable mold and nonmagnetic conducting material such as aluminum is cast about it. Suitable inserts are provided in the mold to provide a slot 22 and a cylindrical hole 23 both extending through the casting from front to back, the slot 22 of a size and shape to accommodate the edge of a meter disc and the hole 23 to accommodate adjustment means to be later described. The bolt 15 is now removed which permits the temporary spacer 14 to be driven out of the casting through the slot 22. It will be observed that the magnetic circuit comprising the pair of blocks 10 and 11, the yoke 12 and the armature 13 are completely surrounded on all sides by the cast body indicated in the drawings as 21, except for the faces of the magnet blocks and the face of the armature in the gap, and that these parts are definitely held in assembled position by means of the cast body alone. As indicated at 19, the armature 13 is locked in the casting by a pair of detents provided thereon one at each end. The armature 13 is conveniently made from a flat bar of appropriate steel and the detents are provided by stamping or deforming the upper surface at each end by an appropriate tool. The cast magnets 10 and 11 are each provided with a groove 20 and are placed in the assembly with the grooves facing each other. The cylindrical hole 23 provided in the unit during casting has its axis lying coincident with the axis of the developed cylinder of which the walls of the magnet grooves as assembled forms a part. A boss 24 is provided on the casting through which the hole 23 passes to provide a support for a calibrating screw. The hole 23 is counterbored from the left hand end as viewed in Fig. 2 for the greater part of its length to provide a seat 28 at the right hand end. A disc 27 of material having a negative temperature coefficient of permeability is inserted in the bore and located against the seat 28. The hole 23 is also tapped as indicated at 25 in Fig. 2 to receive a hollow threaded plug 26 of magnetic material of high permeability. A spring 29 compressed between the hollow plug 26 and the disc 27 holds the disc in place and eliminates back-lash of the plug. The head of the plug 26, lies in a readily accessible position when the damping unit is mounted in the meter and is provided with a screw driven slot, as shown, whereby it may be turned for the calibration of the meter, suitable calibrating indices being cast adjacent thereto on the boss 24. Provided in the casting 21 are also the index marks 31 useful in meter testing, a boss 33 for the mounting of a name plate, and a pair of bosses at 32 whereby the unit may be mounted in a meter. Provided also in the casting, projecting from the bottom, are a pair of lugs 34 for the shelf mounting of the unit in a meter if desired as an alternative. It is apparent that the magnetic plug 26 shunts a portion of the flux away from the air gap path through the armature 13, so that adjustment of this plug outwardly increases the damping flux and slows the meter and adjusting it inwardly decreases the damping flux across the air gap. The temperature compensating shunt 27 having negative temperature coefficient of permeability acts to increase the damping flux with rise in temperature for the purpose of compensating the type of temperature error occurring in induction watthour meters. This shunt is made of the correct dimensions and characteristic to accomplish the desired purpose.

The damping magnet system of my invention offers many advantages. The relatively heavy steel parts, that is the yoke 12 and the keeper 13 are only of the size necessary to form the magnetic circuit required and are, together with the blocks of permanent magnet material, held permanently in their assembled position solely by the cast body 21 without the necessity of welding or other means and with the armature accurately spaced from and aligned with the magnet poles. The body 21 of conductor material such as die cast aluminum surrounding the magnet on all sides offers a very complete shield therefor against the demagnetizing effect of the stray fields. The cast-in assembly with the through hole 23 to provide for the mounting of the calibrating and compensating shunts provides a convenient means for magnetizing the magnet, as a current conductor for this purpose may be passed through the hole prior to the insertion of the shunts. The accurate location of the calibrating screw close to the magnet as provided by my invention makes it possible to get large calibration adjustment, for example plus or minus twenty percent without danger of calibration change during handling.

The cast body 21 completely surrounding the magnet protects it from mechanical damage which would consequently impair its magnetic properties and also reduces the cost of manufacturing the magnets themselves. The magnets are cast and it is desirable in order to reduce cost to cast a bar of some length having the groove 20 along one side and then to break the bar into the individual lengths required at breaking grooves provided transversely along its length as represented in Fig. 4. This method of manufacture results in a rough surface at the break. As the rough surface is embedded in the cast sheath in my damping unit, the necessity for machining them is avoided and in fact the rough surface is desirable for better locking into the material cast around it.

By my method of manufacture, the magnet gap and exterior surfaces of the damping unit are all smooth so that it is relatively easy to keep it clean and free from magnetic particles. In view of the smooth surfaces and the fact that only the pole surfaces of the magnet are exposed, they can be easily wiped clean and any magnetic particles blown from the slot by an air jet.

The damping system of my invention with its wide range of adjustment lends itself to application to a wide range of meter requirements. Without additional cost alternative mounting facilities may be provided on the unit and alternative temperature compensating shunts may be readily substituted.

What I claim as new and desire to secure by Letters Patent of the United States is:

1. A damping magnet system for induction disc meters and the like comprising a pair of blocks of permanent magnet material located spaced apart on a yoke of high permeability material and magnetized to form a U-shaped magnet, an armature of high permeability material spaced from and aligned across spaced poles of the magnet, and a nonmagnetic conducting body cast about the magnet and armature substantially completely enclosing them except for a slot registering with the space between the magnet and the armature, said cast body constituting the sole means holding the blocks of permanent magnet material, the yoke, and the armature in assembled relation, the adjacent surface of said pair of blocks having facing grooves therein, a bore provided in the cast body concentric with the grooves, and a magnetic shunt for the magnet adjustable along the bore.

2. A damping magnet system for induction disc meters and the like comprising a U-shaped permanent magnet with an armature of high permeability material spaced from and aligned with the ends of the U, a conducting nonmagnetic body cast about the magnet and armature substantially completely embedding them except for a slot aligned with the space between the armature and the magnet, a bore extending through the cast body between the legs of the magnet, said bore being screw-threaded and having a calibrating plug of high permeability magnetic material adjustable therealong.

3. A damping magnet system for induction disc meters and the like comprising a U-shaped permanent magnet with an armature of high permeability material spaced from and aligned with the ends of the U, a conducting non-magnetic body cast about the magnet and armature substantially completely embedding them except for a slot aligned with the space between the armature and the magnet, a bore extending through the cast body between the legs of the magnet, a temperature compensating shunt located in one end of said bore and a calibrating shunt adjustably mounted in the other end thereof.

4. A damping magnet system for induction disc meters and the like comprising a U-shaped permanent magnet with an armature of high permeability material spaced from and aligned with the ends of the U, a conducting non-magnetic body cast about the magnet and armature substantially completely embedding them except for a slot aligned with the space between the armature and the magnet, a bore extending through the cast body between the legs of the magnet, said bore being of smaller diameter adjacent one end providing a seat therein, a temperature compensating shunt located on said seat, a calibrating shunt comprising a screwthreaded plug in the other end of the bore.

5. A damping magnet system for induction disc meters and the like comprising a U-shaped permanent magnet with an armature of high permeability material spaced from and aligned with the ends of the U, a conducting non-magnetic body cast about the magnet and armature substantially completely embedding them except for a slot aligned with the space between the armature and the magnet, a bore extending through the cast body between the legs of the magnet, said bore being of smaller diameter adjacent one end providing a seat therein, a disc of material having a negative temperature coefficient of permeability located on said seat, a plug of magnetic material of high permeability screwthreaded in the other end of the bore and constituting an adjustable calibrating shunt, and a spring compressed between the said disc and plug.

ALBERT R. NOBBS.

REFERENCES CITED

The following references are of record in the file of this patent:

UNITED STATES PATENTS

| Number | Name | Date |
|---|---|---|
| 2,284,893 | Barnes | June 2, 1942 |
| 2,309,414 | Nobbs | Jan. 26, 1943 |

FOREIGN PATENTS

| Number | Country | Date |
|---|---|---|
| 453,262 | Great Britain | Sept. 8, 1936 |